United States Patent Office 3,370,865
Patented Feb. 27, 1968

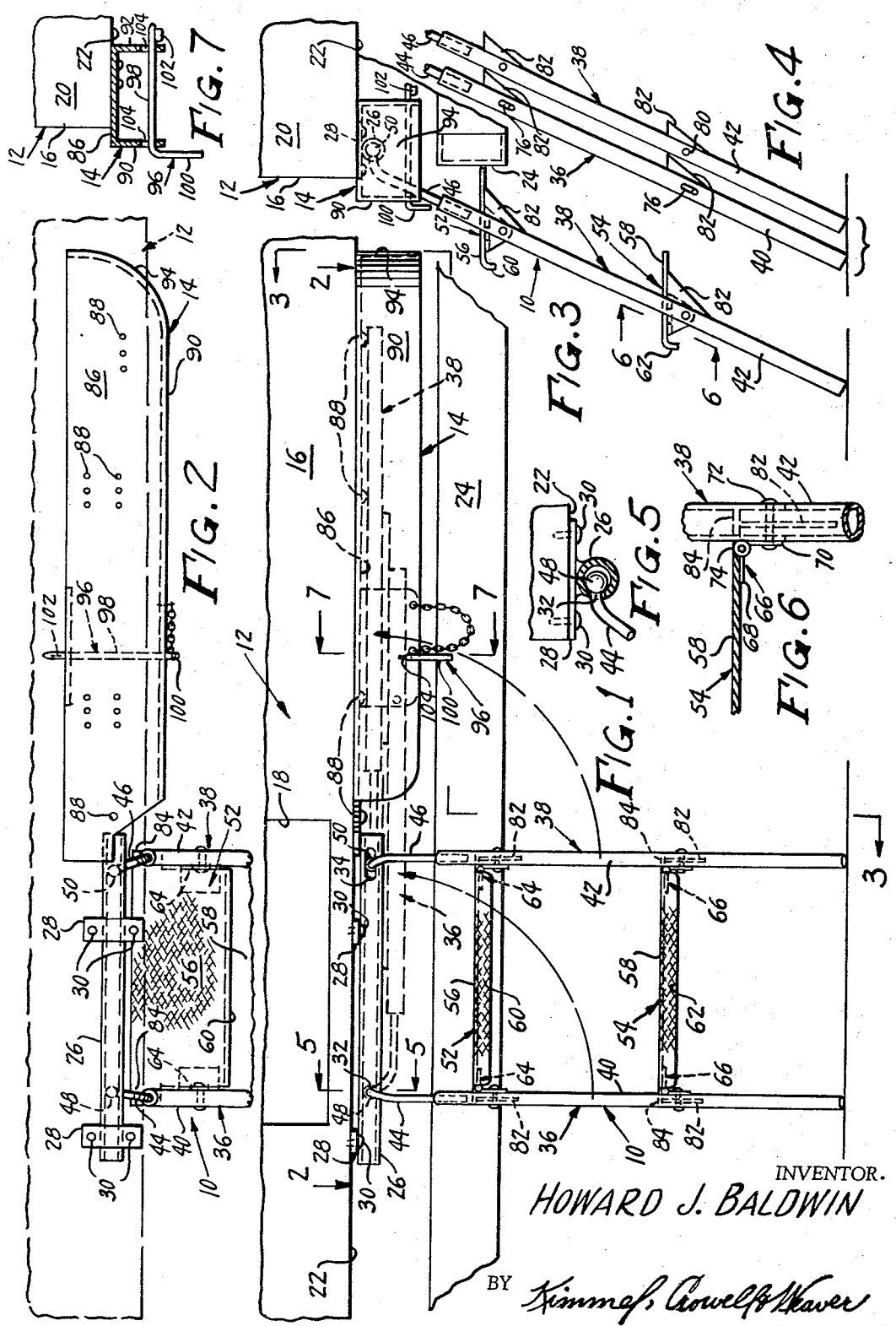

3,370,865
TRAILER STEPS
Howard J. Baldwin, 439 M St., Sparks, Nev. 69220
Filed May 10, 1966, Ser. No. 549,067
8 Claims. (Cl. 280—166)

ABSTRACT OF THE DISCLOSURE

Stair means to provide for the convenient ingress and egress of trailer occupants, the stair means including a pair of laterally spaced substantially parallel rails pivotally connected on the trailer below a door opening, the pivotal connection enabling the rails to be swung from a first position depending from the trailer to a second, concealed, stored position below the bottom wall, and wherein the steps are pivotally connected to and extend between the rails in such a manner as to enable the rails to move into close juxtaposition relative to one another when the stair means is moved into the storage area, and means for releasably securing the stair means in the storage area.

---

This invention relates to a novel arrangement of steps to be mounted adjacent a door of a mobile trailer and more particularly to a device of the character described which may be moved from a first position providing a means facilitating the exit of an individual from the trailer to a second position substantially concealing the steps from view.

It is known in the prior art to provide railway cars with a swingable ramp mounted for movement between a first position extending toward the ground for sliding baggage and the like therealong to a second position generally parallel to the direction of travel of the car for storing the ramp during movement of the train. A pair of generally parallel rails mounted on an elongate member and interconnected by a pair of parallel links providing a parallelogram member, and the ramps of the prior art are usually held in the storage position by an L-shaped upwardly opening arm extending from the side of the railway car.

In providing a foldable stair for a mobile trailer, which includes a wheel mounted mobile home as well as a truck mounted camper, many disadvantages have been found in devices similar to that previously described. A primary disadvantage of a device of the type previously mentioned is that the stair is exposed in the storage position thereby materially detracting from the designed style of the manufacturer. Another disadvantage of the prior art devices when applied to automotive devices is that the stair will not remain in the stored position. This is apparently caused by the much rougher terrain over which an automobile or trailer travels when compared to the smooth tracks over which a train passes. Still another difficulty with a railway car ramp is that the device is specifically constructed for the purpose of sliding trunks or freight, either onto the ground or onto the platform at the side of the track, or onto another car located at the side of the car to which the ramp is attached. Accordingly, the device is not particularly adapted for use as a stair to allow the ingress and egress of persons into and out of a mobile trailer.

In brief terms, the device of the instant invention includes a pair of parallel rails mounted for movement on an elongate member between a first position extending angularly toward the underlying ground surface and a second position extending into a stair receiving space concealed from view. Additionally, the device of the instant invention includes at least one step mounted between the rails for pivotal movement in response to the movement of the rails from the first position into the stair receiving space with means being provided for positively retainng the rails in the storage space.

It is accordingly an object of the instant invention to provide a mobile trailer equipped with a foldable stair which may be moved from a first position affording a step facilitating the entrance and exit of an individual into the trailer to a second position storing the stair in a hidden location.

Another object of the instant invention is to provide a mobile trailer equipped with a foldable stair movable into a hidden storage location, the storage space being formed by a pair of substantially vertical walls, a top wall and an open bottom face with means being provided for positively retaining the stair in the storage space.

Another object of the instant invention is to provide a foldable stair for mobile trailers which is inexpensive to manufacture, easy to install, and which is foolproof in operation.

A further object of the instant invention is to provide a mobile trailer equipped with a foldable stair movable into a storage location in which the stair is positively held against further movement.

Other objects and advantages of the instant invention reside in the combinations of elements, arrangements of parts, and features of construction and operation, all as more fully pointed out hereinafter and disclosed in the accompanying drawing, wherein there is shown a preferred embodiment of this inventive concept.

In the drawings:

FIGURE 1 is a side elevation of the foldable stair of the instant invention mounted on a mobile trailer shown in partial view for purposes of illustration;

FIGURE 2 is a cross sectional view of the device of FIGURE 1 taken substantially along line 2—2 thereof, as viewed in the direction indicated by the arrows, certain portions of the trailer being shown in dash lines and certain portions of the stair being broken away for purposes of illustration;

FIGURE 3 is a side elevational view of the device of FIGURES 1 and 2, showing the stair in the first position providing a plurality of steps facilitating entrance and exit of an individual into the trailer;

FIGURE 4 is a view of each of the movable rails comprising a portion of the foldable stair of the instant invention;

FIGURE 5 is an enlarged transverse cross sectional view of the device of FIGURES 1 to 3 inclusive, taken substantially along line 5—5 of FIGURE 1 as viewed in the direction indicated by the arrows, illustrating the connection between the rail and the elongate support fixedly secured to the trailer;

FIGURE 6 is an enlarged cross sectional view of the connection between the step and the rail taken substantially along line 6—6, of FIGURE 3 as viewed in the direction indicated by the arrows; and FIGURE 7 is a transverse cross sectional view of the device of FIGURES 1 to 3 inclusive, taken substantially along line 7—7 of FIGURE 1 as viewed in the direction indicated by the arrows illustrating the stair receiving space and the pin positively retaining the stair in the storage location.

General construction and operation

Referring now to the drawing in detail, wherein like reference characters designate like elements throughout the several views thereof, the foldable stair of the instant invention is shown generally at 10 mounted on a mobile trailer shown generally at 12 for movement between a first position shown in solid lines in FIGURE 1 facilitating the entrance of an individual into trailer 12 and a second position shown in dash lines in FIGURE 1 into a stair storage housing shown generally at 14 where foldable stair 10 is stored during travel of the trailer.

Trailer 12 includes a first vertical wall 16 forming a door opening 18 immediately above stair 10. Trailer 12 also includes a second vertical wall 20 intersecting wall 16 at right angles and a substantially horizonal bottom wall 22 intersecting vertical walls 16, 20 to form part of an enclosure in which the customary appliances are placed. Wall 16 is illustrated as the rear wall of a camper type vehicle with a bumper 24 being spaced below bottom wall 22.

Stair

Stair 10 includes an elongate tubular member 26 affixed to bottom wall 22, parallel thereto, by a plurality of T-shaped brackets 28 and a series of conventional fasteners 30 illustrated as rivets. Tube 26 forms a first opening 32 for closely receiving one of the rails of stair 10 and a second opening 34 configured as a slot for receiving the other rail of stair 10 for purposes more fully pointed out hereinafter.

Stair 10 includes a leftmost rail shown generally at 36 and a mirror image second rail shown generally at 38 respectively mounted in openings 32, 34 for pivotal movement as shown by the arrows in FIGURE 1. Rails 36, 38 include a substantially tubular supporting element 40, 42 fixedly receiving the end of a slightly inwardly bent shank 44, 46. Each of shanks 44, 46 carrying an enlargement 48, 50 within tubular member 26 allowing pivotal movement of rails 36, 38 and at the same time retaining rails 36, 38 secure to trailer 12. The connection between rails 36, 38 and supporting tube 26 may be effected in any number of ways, as by forming openings 32, 34 of a sufficient size to receive enlargements 48, 50 and then partially welding the opening such that the enlargement will not pass therethrough. Another mode of effecting this connection is by taking a flat sheet and cutting enlargements therein sufficient to receive shanks 44, 46, forming enlargements 48, 50 on the ends of shanks 44, 46 and then rolling the flat sheet to form tubular support 26.

Interconnecting rails 36, 38 is a pair of steps shown generally at 52, 54, although it should be understood that any number of desired steps may be used. Each of steps 52, 54 include a substantially planar segment 56, 58 of sufficient width to support the foot of an individual and a forwardly disposed downturned edge 60, 62. A pair of hinge connections shown generally at 64, 66 pivotally connect each of steps 52, 54 to rails 36, 38 providing for the pivotal movement of steps 52, 54 when stair 10 is moved from the first position, shown in solid lines in FIGURE 1, to the second storage position, shown in dash lines in FIGURE 1.

Hinges 64, 66 are of a substantially conventional type and will be described with reference to hinge 66 in FIGURE 6. Hinge 66 includes a first hinge plate 68 fixedly secured to the underside of planar segment 58 as by welding or the like, a second hinge plate 70 fixedly secured to the associated rail in any conventional manner illustrated as a rivet 72 and a bearing pin 74 interconnecting hinge plates 68, 70 in a conventional manner. Although hinges 64, 66 may be constructed to allow free pivotal movement of stair 10 in the manner previously described, as by spacing hinge pin 74 away from rails 36, 38, it has been found preferable to provide a longitudinal slot 76 (FIGURE 4) in rail 36 to allow the counterclockwise rotation of stair 10. If it is desired to make stair 10 for clockwise rotation, rail 38 may be provided with such a slot in lieu of rivet receiving aperture 80. In order to make a universal stair, both rails 36, 38 may be provided with such a slot.

Supporting steps 52, 54 when stair 10 is in the first position shown in solid lines in FIGURE 1 is a series of horizontally aligned vertically spaced bench supports 82 extending rearwardly from rails 36, 38 as shown in FIGURES 1, 3, 4 and 6. Cooperating with bench supports 82 is a pair of ears 84 extending laterally of foot supporting segments 56, 58, as shown best in FIGURES 2 and 6. By accurately spacing bench supports 82 with respect to the ends of ears 84, steps 52, 54 will be supported thereon when stair 10 is in the solid line position of FIGURE 1 while pivotal movenemt of rails 36, 38 will clear bench supports 82 and ears 84 on rails 38 to allow the necessary pivotal movement into the storage position.

Storage space

Storage housing 14 is a substantially U-shaped structure in cross section as shown in FIGURE 7 having a horizontal side 86 secured in any suitable manner to bottom wall 22 of trailer 12 as by fasteners 88 illustrated as rivets or screws, a first vertical side 90 spaced outwardly from vertical wall 16 of trailer 12, a second vertical side 92 substantially parallel to first side 90 and residing under trailer 12 and a plate 94 covering the end of housing 14. As shown best in FIGURE 1, housing 14 is positioned immediately to one side of tubular support 26 to receive stair 10 when it is folded into the storage position. Since tubular support 26 is positioned under trailer 12 and since housing 14 substantially hides rails 36, 38, it will be evident that the neat appearance of trailer 12 will be maintained and not disturbed by the provision of stair 10.

Providing for the positive retention of stair 10 in the storage position is a movable pin shown generally at 96. Pin 96 is substantially L-shaped in configuration, having a long leg 98, a short leg 100, and a key lobe 102 on the terminal end of leg 98. A pair of horizontally aligned openings 104 is provided by sides 90, 92 for the reception of pin 96.

As shown best in FIGURE 1, openings 104 are preferably shaped as an inverted keyhole, i.e., a lower circular opening and an upwardly extending slot communicating therewith. Pin 96 is rotated 180° from the position shown in FIGURE 7 to register lobe 102 with the upwardly extending slot of opening 104 thereby allowing insertion and retraction of pin 96. After stair 10 is moved to the storage position shown in dash lines in FIGURE 1, pin 96 is inserted through openings 104 followed by the rotation of leg 100 to the downwardly extending position.

It will be evident that pin 96 will engage stair 10 in load supporting relation and, in conjunction with housing 14, prevent lateral or up and down movement of stair 10. It will also be seen that pin 96 cannot be accidentally displaced by vibration of trailer 12 since handle 110 imbalances pin 96 thereby effectively preventing rotation. Since pin 96 cannot be accidentally rotated, the required registering of lobe 102 and opening 104 is prevented.

It is now seen that there is herein provided an improved trailer step having all of the objects of the instant invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in limiting sense.

I claim:
1. In the combination,
   a vehicle having at least one vertical wall provided with a door opening therein, and a normally horizonal bottom wall;
   a cover member secured to said vehicle and having a side extending substantially parallel to the vertical wall and defining, with said bottom wall, a stair receiving storage space;
   a foldable stair including
      an elongate substantially straight tubular member se- cured to said trailer immediately below said door opening and having a pair of opposed ends, of which one of said ends is disposed in juxtaposed confronting relationship relative to said storage space;

said tubular member having a pair of openings formed therein of which one of said openings comprises an elongated slot disposed adjacent one end of said tubular member, the other of said openings being remotely disposed relative to said one end;

a pair of substantially parallel rails and including means on one pair of adjacent ends thereof to pivotally mount said rails on said tubular member to permit their movement to and from a first position in which the other ends of said rails extend toward an underlying ground surface and a second position in which said other ends of said rails extend into said stair storage receiving space;

said pivotal connecting means including an enlargement formed on each rail at said one pair of ends thereof and adjacent portion of said rails, said enlargements being disposed within said tubular member with said adjacent portion of one of said rails being loosely reecived within said slot and said adjacent portion of the other of said rails being snugly journaled for povital movement in the other of said openings to prevent longitudinal movement of said rails upon pivotal movement of said rails between said first and second positions;

at least one step between said rails;

means pivotally connecting said step to each of the rails for pivotal movement about a pair of axes substantially perpendicular to the plane of the vertical wall when the rails are in the first position; and means for selectively positively retaining the rails in said second position.

2. The combined vehicle and stair of claim 1 wherein said tube having a pair of opposed ends with one of its said ends being disposed in juxtaposed confronting relationship relative to said stair receiving space;

the first opening nearer the cover member, comprises a slot loosely receiving the rail passing therethrough; and the second opening, farther from the cover member, is only slightly larger than the rail passing therethrough preventing longitudinal movement of the second rail upon pivotal movement of the rails between the first and second positions.

3. The combined vehicle and stair of claim 2 wherein at least one side of the step is mounted on the rail for limited movement along the axis of the rail providing for the free pivotal movement of the rails.

4. The combined vehicle and stair of claim 2 wherein the side of the step opposite from the cover member is mounted on the rail for limited movement along the axis of the rail providing for the free pivotal movement of the rails.

5. In combination, a mobile trailer having at least one vertical wall having a door opening formed therein, and a normally horizontal bottom wall; a cover member, secured to the trailer, having a side extending generally parallel to the wall to define a stair receiving space between the bottom wall and the side; a foldable stair including an elongate member secured to the trailer immediately below the door opening, the elongate member comprises a substantially straight tube having a first opening pivotally receiving the end of the first rail and a second opening pivotally slideably receiving the second rail; a pair of parallel rails mounted on the elongate member for movement between a first position extending toward an underlying ground surface and a second position extending into the stair receiving space; an enlargement on the end of each rail within the tube retaining the rails in the openings; at least one step between the rails; and means pivotally connecting the step to each of the rails for pivotal movement about a pair of axes substantially perpendicular to the plane of the vertical wall when the rails are in the first position; and means for selectively positively retaining the rails in the second position.

6. The combined trailer and stair of claim 5 wherein the trailer includes a horizontal wall intersecting the vertical wall below the door; and the elongate member is fixedly secured to the horizontal wall.

7. The combined trailer and stair of claim 6 wherein each of the rails is mounted on the elongate member for pivotal movement about an axis substantially perpendicular to the vertical wall for movement into a vertically spaced relationship in the storage space.

8. The combined trailer and stair of claim 7 wherein at least one of the rails includes a bench support having a substantially horizontal surface underlying the step engaging the step in load supporting relation when the stair is in the first position.

References Cited

UNITED STATES PATENTS

| 241,049 | 5/1881 | Mooney | 182—156 |
| 533,209 | 1/1895 | Coggeshall | 280—166 |
| 666,566 | 1/1901 | Sherman | 182—96 |
| 1,871,828 | 8/1932 | Van Vorst | 280—150.5 |
| 2,575,615 | 11/1951 | Crump | 280—166 |

BENJAMIN HERSH, *Primary Examiner.*

J. E. SIEGEL, *Assistant Examiner.*